United States Patent
Roukes et al.

(10) Patent No.: US 6,593,731 B1
(45) Date of Patent: Jul. 15, 2003

(54) DISPLACEMENT TRANSDUCER UTILIZING MINIATURIZED MAGNET AND HALL JUNCTION

(75) Inventors: Michael L. Roukes, Pasadena, CA (US); Franklin G. Monzon, Portland, OR (US); Michael J. Murphy, Mullica, NJ (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/612,828

(22) Filed: Jul. 7, 2000

Related U.S. Application Data

(60) Provisional application No. 60/142,851, filed on Jul. 8, 1999.

(51) Int. Cl.$^7$ .............................. G01B 7/14; H01L 43/06
(52) U.S. Cl. .............................. 324/207.2; 324/207.26; 438/48
(58) Field of Search .......................... 324/207.2, 207.26, 324/235, 251; 338/32 H; 438/3, 48, 50, 52; 257/421, 427, 415

(56) References Cited

U.S. PATENT DOCUMENTS

| | | | | |
|---|---|---|---|---|
| 4,355,280 A | * | 10/1982 | Duzich ................. | 324/207.24 |
| 6,012,021 A | * | 1/2000 | Rombach et al. ........ | 324/207.2 |

OTHER PUBLICATIONS

Cleland, A.N., and Roukes, M.L; *Fabrication of High Frequency Nanometer Scale Mechanical Resonators from Bulk Si Crystals*; Appl. Phys. Lett. 69 (18), Oct. 28, 1996; American Institute of Physics; 1996, pp. 2653–2655.
Cleland, A.N. and Roukes, M.L.; *Nanoscale Mechanics*, Nanoscale Mechanics.dot submitted to World Scientific Sep. 21, 1998., 8 pages.
Cleland, A.N. and Roukes, M.L.; *A Nonometre–Scale Mechanical Electrometer*, Nature, vol. 392, Mar. 12, 1998, pp. 160–162.
Monzon, F.G.; Johnson, Mark, and Roukes, M.L.; *Strong Hall Voltage Modulation in Hybrid Ferromagnet/Semiconductor Microstructures*; Appl. Phys. Lett. 71 (21), Nov. 24, 1997, American Institute of Physics, 1997, pp. 3087–3089.
Monzon, F.G.; Patterson, D.S.; and Roukes, M.L.; *Characterization of Individual Nanomagnets by the Local Hall Effect*, Condensed Matter Physics 114–36; California Institute of Technology, Pasadena, CA 91125; 15 pages.
Schiele, Ignaz, et al., *Micromechanical Relay with Electrostatic Actuation*; Transducers '97; 1997 International Conference on Solid State Sensors and Actuators, Chicago, Jun. 16–19, 1997, pp. 1165–1168.
*Electrostatically Actuated Micromechanical Switches Using Surface Micromachining*; Northeastern: Microsensors:microrelay, May 14, 2000; 6 pages.
*Hall Effect*; http://goophy.physics.orst.edu/~ph213/lecture/12/nodel.html; Physics 213, Jan. 20, 1996; printed on May 20, 2000, 2 pages.
*Table of MEMS Switch Characteristics*, http://www.ai.mit.edu/~mpf/MEMS/table.html; printed on May 14, 2000, 3 pages.

* cited by examiner

*Primary Examiner*—Walter E. Snow
(74) *Attorney, Agent, or Firm*—Howrey Simon Arnold & White, LLP

(57) ABSTRACT

A displacement transducer in which relative displacement between a magnet and a Hall junction is sensed. Magnetic flux from the magnet is linked to the Hall junction in a direction perpendicular to the flow of current through the Hall junction. Relative displacement between the magnet and the Hall junction causes a change in the magnetic flux linked to the Hall junction which in turn causes a change in transverse voltage across the Hall junction. A signal representative of this voltage change is output from the transducer. The transducer may be part of a NEMS or MEMS.

44 Claims, 8 Drawing Sheets

US 6,593,731 B1

DISPLACEMENT TRANSDUCER UTILIZING MINIATURIZED MAGNET AND HALL JUNCTION

This application claims the benefit of U.S. Provisional Application No. 60/142,851, filed Jul. 8, 1999, which is hereby fully incorporated by reference herein as though set forth in full.

The U.S. Government has certain rights in this invention pursuant to Grant No. DABT 63-98-1-0012 awarded by DARPA.

BACKGROUND OF THE INVENTION

1. Field of the Invention

This invention generally relates to displacement transducers, and, more specifically, to high sensitivity displacement transducers for MEMS and NEMS

2. Background

A displacement transducer is a device which senses displacement of an object, and, responsive thereto, provides an electrical signal representative of the displacement of the object. Known displacement transducers sense macro-level displacements. However, these transducers are not readily scaleable to micro-or nano-scale dimensions, although many applications exist for micro-or nano-level displacement transducers. System-level applications for such transducers are generally referred to as micro-electro-mechanical systems (MEMS) or nano-electro-mechanical transducers (NEMS). Consequently, there is an unmet need for micro-or nano-scale displacement transducers.

SUMMARY

In accordance with one aspect of the invention, there is provided a displacement transducer in which a movable mechanical element is mounted through at least one anchor point to a substrate. The element is mounted in close proximity to a Hall sensor. The Hall sensor has a Hall junction which is linked to magnetic flux emanating from the magnet integrated into the mechanical element. A force is exerted on the mechanical element, causing displacement of the magnet. The displacement of the magnet causes a change in the magnetic flux linked to the Hall junction. The change in magnetic flux linked to the Hall junction induces a change in the voltage potential across the Hall junction. One or more signal lines are coupled to the Hall junction. A signal is output on these signal lines which is representative of the change in transverse voltage across the Hall junction.

In one implementation, the mechanical element is a diamond-shaped torsional resonator mounted to the substrate at first and second anchor points. A thin film magnet is integrated into the resonator. When a force is exerted on the resonator, vertical displacement, either upwards or downwards, of the ends of the magnet is achieved.

The Hall sensor in this implementation is a four-terminal semiconductor Hall sensor which is also anchored to the substrate. Two of the terminals are current terminals coupled together through a Hall junction. The other two terminals are voltage terminals coupled to either side of the Hall junction. The terminals are in a folded cross-shaped configuration to facilitate placement of the Hall junction in close proximity to the magnet. That allows a greater amount of magnetic flux emanating from the magnet to be linked to the Hall junction, thereby increasing the sensitivity of the transducer.

Other implementations are possible in which the mechanical device is formed of a flexural device such as a suspended cantilever or suspended beam into which a micro-or nano-scale magnet is incorporated. Moreover, an equivalent embodiment is possible in which the Hall sensor is integrated within a mechanical element which is anchored to the substrate in close proximity to a stationary micro-or nano-scale magnet.

DETAILED DESCRIPTION OF EMBODIMENTS

Figure 1:
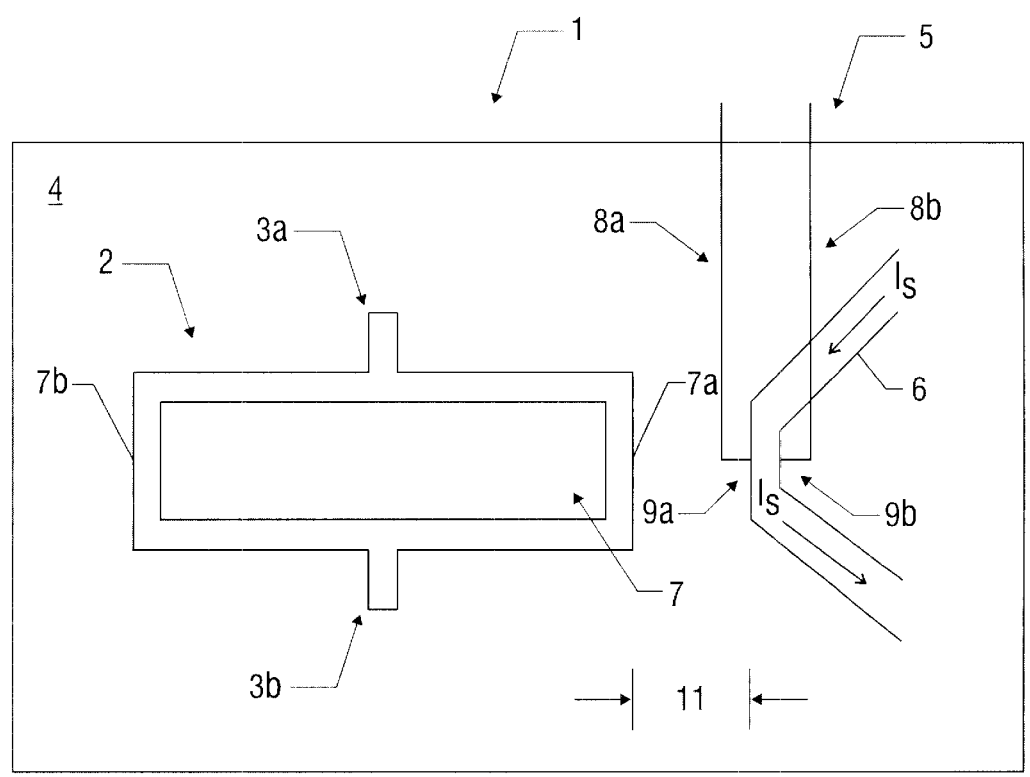
FIG. 1 illustrates a first embodiment of a transducer in accordance with the subject invention.

A first embodiment of a displacement transducer 1 in accordance with the subject invention is illustrated in FIG. 1. As illustrated, the transducer 1 comprises a movable mechanical element 2 which is mounted through at least one anchor point 3a, 3b to a substrate 4. The element is mounted in close proximity to a Hall sensor 5. The Hall sensor 5 has a Hall junction 6 which is linked to magnetic flux emanating from a magnet 7 integrated into the mechanical element 2. A bias current $I_S$ flows through the Hall junction 6. A force is exerted on the mechanical element 2, causing displacement of one or both of ends 7a, 7b of the magnet 7. In one implementation, this may be in a direction into or out of the page. This displacement causes a change in the magnetic flux linked to the Hall junction 6. The change in magnetic flux linked to the Hall junction 6 induces a change in the voltage potential across the Hall junction 6. In one implementation, the magnetic flux which is relevant to this process is perpendicular to the page.

One or more signal lines 8a, 8b are coupled to terminals 9a, 9b on either side of the Hall junction 6. A signal is output on these signal lines which is representative of the change in transverse voltage across the Hall junction 6 caused by the change in the magnetic flux linked to the Hall junction.

Figure 2:
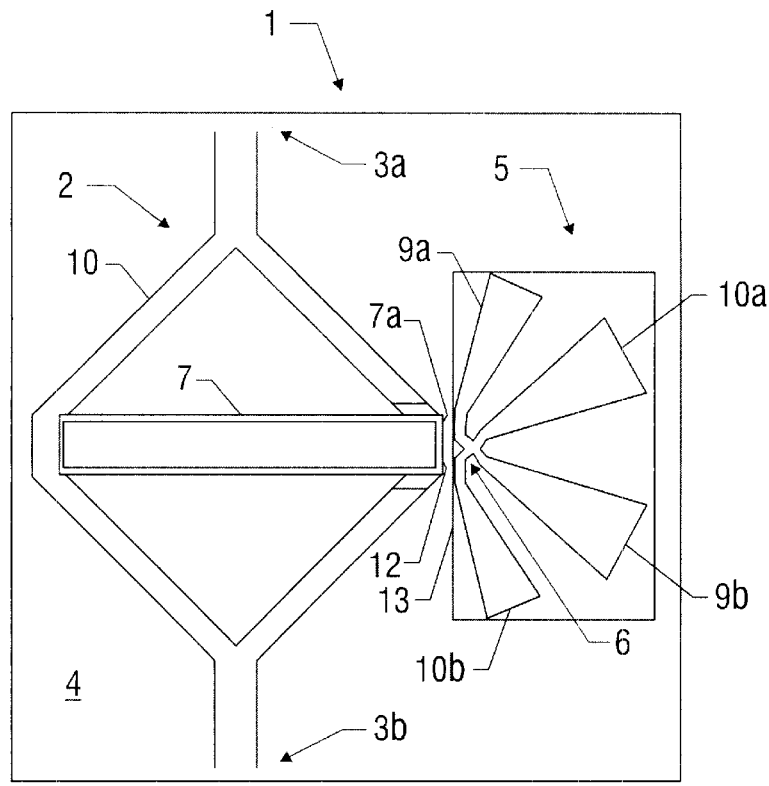
FIG. 2 illustrates a top view of a second embodiment of a transducer in accordance with the subject invention.

A top view of a second embodiment of a displacement transducer in accordance with the subject invention is illustrated in FIG. 2 in which, compared to FIG. 1, like elements are referenced with like identifying numerals. In this embodiment, the mechanical element 2 is a diamond-shaped torsional resonator 10 mounted to the substrate at first and second anchor points 3a, 3b. A thin film magnet 7 is integrated into the resonator. When a force is exerted on the resonator, vertical displacement, either upwards or downwards, of the ends of the magnet is achieved.

Figure 3:
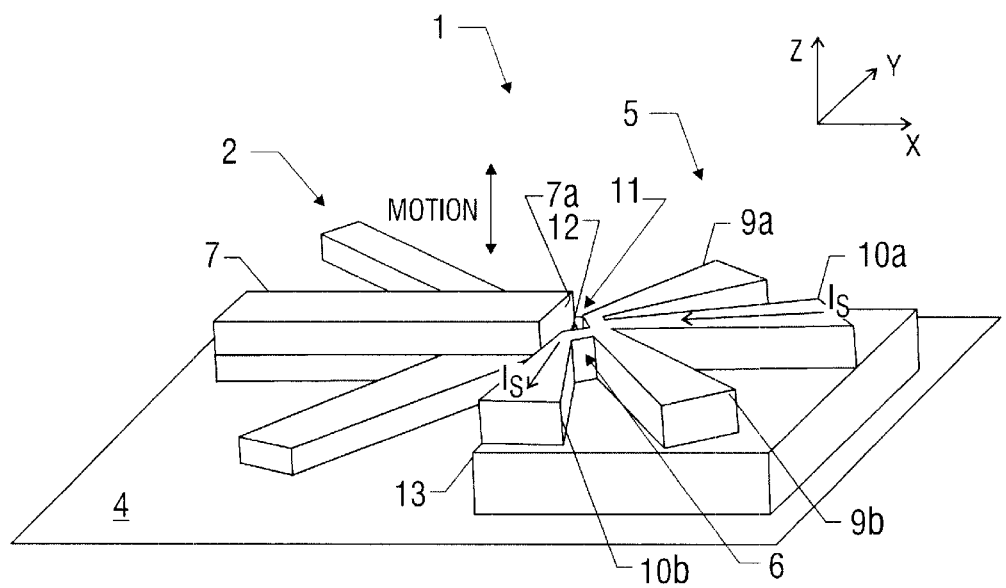
FIG. 3 illustrates a side view of the second embodiment of FIG. 2.

A side view of the embodiment of FIG. 2 is illustrated in FIG. 3 in which, relative to FIG. 2, like elements are referenced with like identifying numerals. As illustrated, in this embodiment, a force may be exerted on the mechanical device 2 which causes displacement of end 7a of the magnet in the z direction. This displacement causes a change in the z-component of the magnetic flux emanating from magnet 7 and linked to the Hall junction 6. A bias current $I_S$ flows through the Hall junction 6 in the y-direction. The change in the z-component of the magnetic flux linked to the Hall junction induces a change in the voltage potential across the Hall junction 6.

In one implementation, the Hall sensor 5 is also anchored to the substrate 4. 15 The Hall junction 6 forms a link between current terminals 10a, 10b. Voltage terminals 9a, 9b are provided on either side of the Hall junction. Collectively, the voltage and current terminals 9a, 9b, 10a, 10b form a folded cross-shaped configuration to facilitate placement of the Hall junction in close proximity to the magnet. That allows a greater amount of magnetic flux emanating from the magnet to be linked to the Hall junction, thereby increasing the sensitivity of the transducer. In one implementation, the gap 11 between the edge 12 of the magnet 7 and the edge 13 of the Hall sensor is about 50 nm (although the center-to-edge gap, from the center of the Hall junction to the edge of the magnet, is about 100–200 nm using conventional electron lithography techniques).

Other implementations are possible in which the mechanical device 2 is formed of a flexural device such as a suspended cantilever or suspended beam into which a micro- or nano-scale magnet is incorporated. Moreover, an embodiment is possible in which the Hall sensor is integrated within a mechanical element which is anchored to the substrate in close proximity to a stationary micro-or nano-scale magnet. A force exerted on the mechanical device 2 causes displacement of the Hall sensor relative to the magnet. The end result is the same: a change in the magnetic flux linked to the Hall junction. As before, this change in magnetic flux induces a change in the transverse voltage across the Hall junction.

Figure 4:
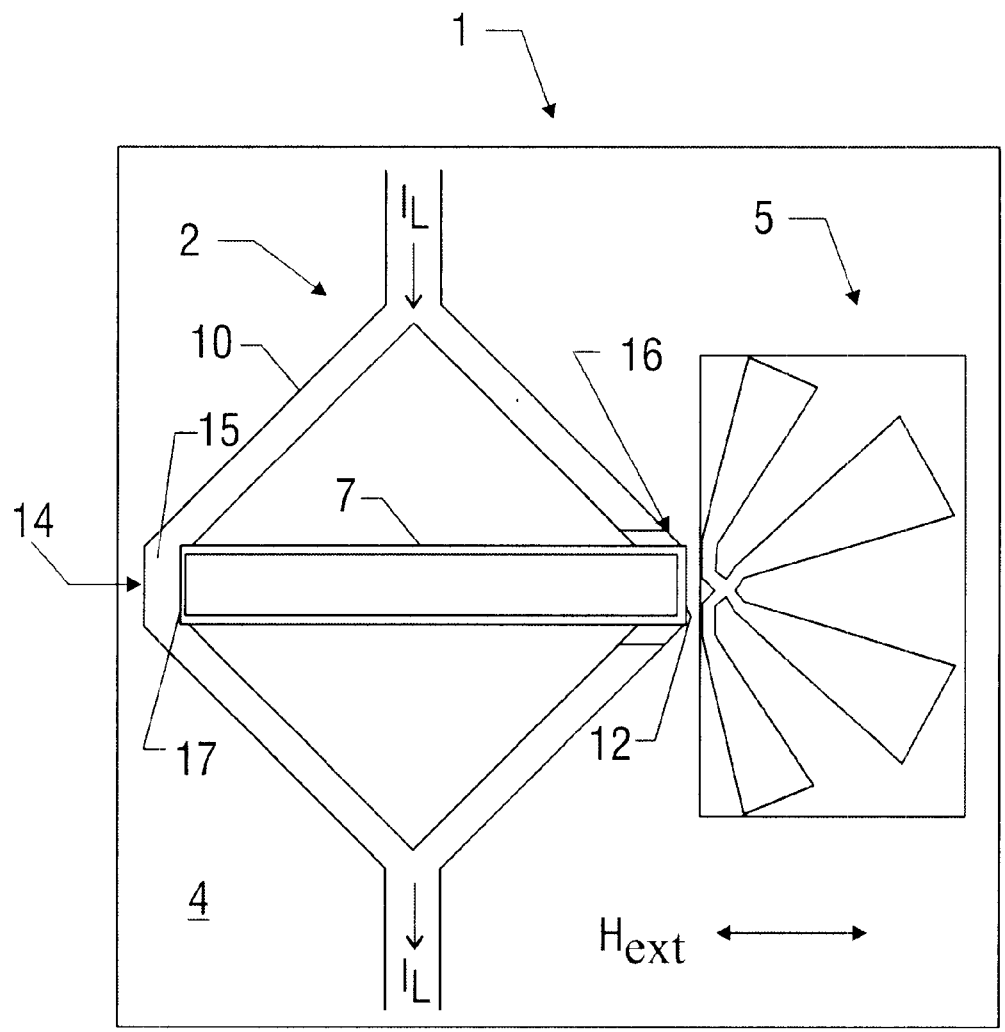
FIG. 4 illustrates a top view of an implementation of the second embodiment of FIGS. 2–3.

FIG. 4 illustrates a top view of an implementation of the embodiment of FIGS. 2–3 in which, compared to FIGS. 2–3, like elements are referenced with like identifying numerals. In this implementation, the left portion 14 of diamond-shaped torsional element 10 includes a continuous current path 15 for supporting the flow of current $I_L$. In contrast, the right portion 16 of the element 2 lacks such a continuous current path.

The current $I_L$ may flow in the y-direction. An external magnetic field $H_{ext}$ is applied in a direction perpendicular to the flow of the current $I_L$ The combination of $I_L$ and $H_{ext}$ serves to generate a Lorentz force to activate the device. In the case where the current $I_L$ flows in the y-direction, the magnetic field Hex, may be applied in the x-direction. The flow of the current $I_L$ in the presence of the external magnetic field $H_{ext}$ induces a Lorentz force on the magnet 7, causing each of the ends 12, 17 to be displaced in opposite directions in the z-direction. In addition to contributing to the generation of a Lorentz force, the external magnetic field $H_{ext}$ also serves to polarize the magnet 7.

Other than the generation of the force on the mechanical element 2, the operation of the implementation of FIG. 4 functions identically to that illustrated in FIGS. 2–3. Therefore, no further explanation is necessary.

Figure 5:
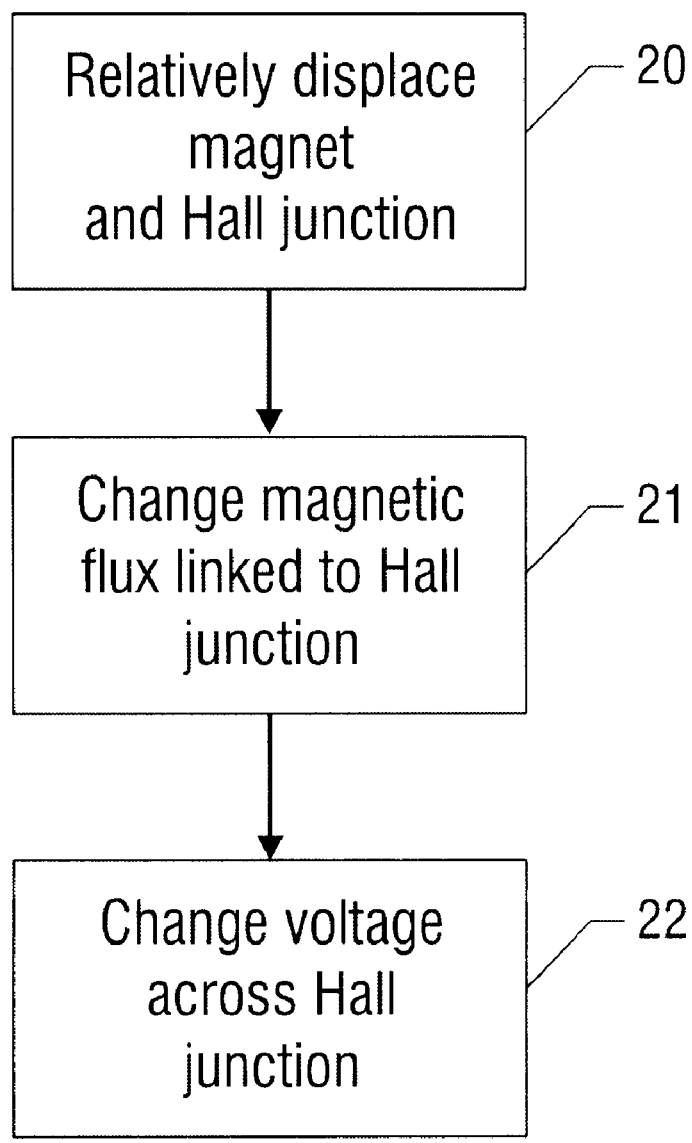
FIG. 5 illustrates a flowchart of a method in accordance with the subject invention.

A method of operation of a transducer in accordance with the subject invention is illustrated in FIG. 5. As illustrated, the method begins with step 20, a Hall junction and a magnet are relatively displaced. The method then proceeds to step 21 in which the relative displacement of the Hall junction and the magnet from step 20 causes a change in the component of magnetic flux linked to the Hall junction which is in a direction perpendicular to the flow of current through the Hall junction. Step 21 is followed by step 22 in which the change in the magnetic flux linked to the Hall junction causes a change in the transverse voltage across the Hall junction. Optionally, the voltage signal may then be amplified. This may also serve to achieve impedance transformation to avoid externally loading the transducer.

A. Transducer Sensitivity and Minimum Resolvable Displacement

The transducer sensitivity, R, is the change in the voltage potential across the Hall junction divided by the displacement $\partial Z$ in the mechanical device which causes the change in voltage potential. This sensitivity can be given by the following expression:

$$R = I_S \rho_H \frac{\partial B_z}{\partial z} \quad (1)$$

where $I_S$ is the bias current through the Hall junction, $\rho_H$ is the Hall coefficient of the Hall sensor, $\partial B_z/\partial z$ is the gradient of the magnetic flux linked to the Hall junction in a direction which is perpendicular to the flow of $I_S$ through the Hall junction. The Hall coefficient $\rho H$ is given by the following expression:

$$\rho_H = \frac{1}{n_S e} \quad (2)$$

where $n_s$ is the sheet density and e is the amount of electric charge in one electron.

The minimum resolvable displacement $\partial z_{min}$ is given by the following expression:

$$\partial z_{min} = \frac{S_V^{1/2}}{R} \quad (3)$$

where $S_V$ is total voltage noise spectral density at the transducer output, and R is the previously-discussed transducer sensitivity. The noise processes that contribute to $S_V$ include thermal noise in the Hall junction, voltage and current noise in the assumed amplifier coupled after the Hall junction voltage probes which are the transducer output, 1/f noise in the sensor, shot noise in the sensor, and cross-correlation noise. Assuming the shot and cross-correlation noise is negligible (accurate in practice), $S_V$ can be expressed as follows:

$$S_V = 4k_B T R_S + S_V^{amp} + S_I^{amp} R_S^2 + I_S S_R \quad (4)$$

where $R_S$ is the two-terminal output impedance, $K_B$ is Boltzman's constant, T is ambient temperature, $S_V^{amp}$ is the total voltage noise spectral density of the assumed readout amplifier, $S_I^{amp}$ is the total current noise spectral density of the assumed readout amplifier, and $S_R$ is the spectral density of (1/f) resistance fluctuations within the sensor. The first and last terms in this equation represent the contribution to the total voltage noise spectral density at the transducer output due to the Hall sensor, and the second and third terms represent the contribution to this density from the assumed amplifier.

Assuming the transducer is power matched to the amplifier, that the readout amplifier can be characterized as a thermal noise voltage source of impedance $R_S$ at an effective noise temperature $T_S$, and that the 1/f noise contribution is negligible (appropriate for high frequencies), the expression for $S_V$ can be simplified to:

$$S_V = 4K_B(T+T_N)R_S \quad (5)$$

The minimum resolvable displacement $\partial Z^{min}$ is given by the following expression:

$$\partial z^{min} = \frac{S_V^{1/2}}{R} = S_V^{1/2}\left(\frac{1}{\rho_H I_S}\right)\left(\frac{\partial B}{\partial z}\right)^{-1} \quad (6)$$

This expression demonstrates that there are tradeoffs involved in the optimization of $\partial Z^{min}$. For example, one would like to decrease $n_S$ in order to increase $\rho_H$, and thus increase the sensitivity R. However, that comes at the expense of an increase in Johnson noise caused by an increase in the output impedance $R_S$ of the sensor.

The sensitivity R and minimum resolvable displacement $\partial z^{min}$ were estimated for four cases: a Hall junction composed of two-dimensional electron gas (2DEG) at 300 K and 4.2 K, and a Hall junction composed of n+GaAs at 300 K and 4.2 K. For each case, it is assumed that the center-to-edge gap 11 (see FIGS. 1–4) is 200 nm in the x-direction and 40 nm in the z-direction, and that the magnet is a permalloy (Ni:Fe) metal film. Using these parameters and assumptions, the value of the magnetic field $B_z$ and the gradient $\partial B_z/\partial z$ are respectively estimated to be 200 G and 4600 G/$\mu$m. Additional assumptions are summarized in the following table:

| Case | $\mu$(cm$^2$/Vs) | $n_S$(cm$^{-1}$) | $R_S(\Omega)$ | $R_H(\Omega/T)$ | $I_S$(mA) |
|---|---|---|---|---|---|
| 300K, n + GaAs | 600 | $2 \times 10^{18}$ | 1040 | 62.5 | 3.1 |
| 4.2K, n + GaAs | 600 | $2 \times 10^{18}$ | 1040 | 62.5 | 0.31 |
| 300K, 2DEG | 7000 | $4 \times 10^{11}$ | 2230 | 1560 | 2.1 |
| 4.2K, 2DEG | $3 \times 10^6$ | $4 \times 10^{11}$ | 5.2 | 1560 | 4.3 |

Consistent with these assumptions, the thermal noise $N_T$ of the Hall junction, the voltage noise $N_V$ of the assumed readout amplifier, the current noise $N_I$ of the assumed readout amplifier, the sensitivity R, and the minimum resolvable displacement $\partial z^{min}$ were estimated as follows:

locations in close proximity to the magnet. This miniaturization is one aspect of the invention which is critical and sets the technique apart from conventional Hall sensors. In light of equations (1) and (6), it can be seen that a large field gradient gives rise to a high transducer sensitivity and small minimum resolvable displacement. Thus, it is important that the Hall junction be situated in close proximity to the magnet (ideally, sub-micro separation). In addition, it is necessary that the size of the junction area be scaled down in direct proportion to the size of the magnet and gap so that field averaging which is inherent only be over the areas in which the field is largest.

With reference to FIG. 3, the magnet may be a thin film ferromagnet uniformly or substantially magnetized along the x-direction. In addition, it is assumed that the end 7a of the magnet is displaceable in the z-direction. The question is the dependence of the field gradient $\partial B_z/\partial z$ on the gap 11 between the end 7a of the magnet and the edge 13 of the Hall junction.

Figure 6:
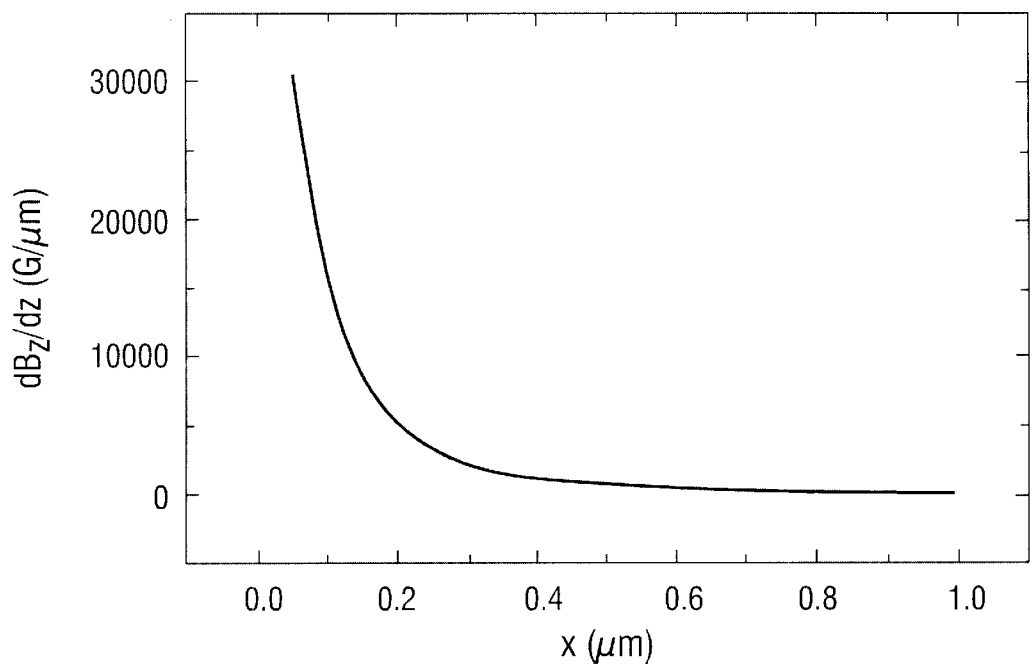
FIG. 6 is a plot of the decay of the perpendicular component of the estimated field gradient from a thin film magnet with separation from the magnet in the x-direction.

The gap 11 may have components in the x-, y-, and z-direction. In one implementation, due to the limitations imposed by current fabrication techniques, the minimum size of the center-to-edge gap in the x-direction ranges between 100 nm and 400 nm. A plot of the decay of the z-component $\partial B_z/\partial z$ of the estimated field gradient with separation in the x-direction is illustrated in FIG. 6. As can be seen, the decay increases quite rapidly for separations in the x-direction of 200 nm or more.

With current electron beam lithography techniques, the typical alignment accuracy is on the order of 50 nm or better. Assuming a Hall junction of diagonal width on the order of 200 nm, and also assuming that the field at the center of the junction is the effective average field, the minimum effective center-to-edge separation in the x-direction is presently about 100–200 nm, although it is contemplated that this separation will be reduced with improvements in fabrication techniques.

Figure 7:
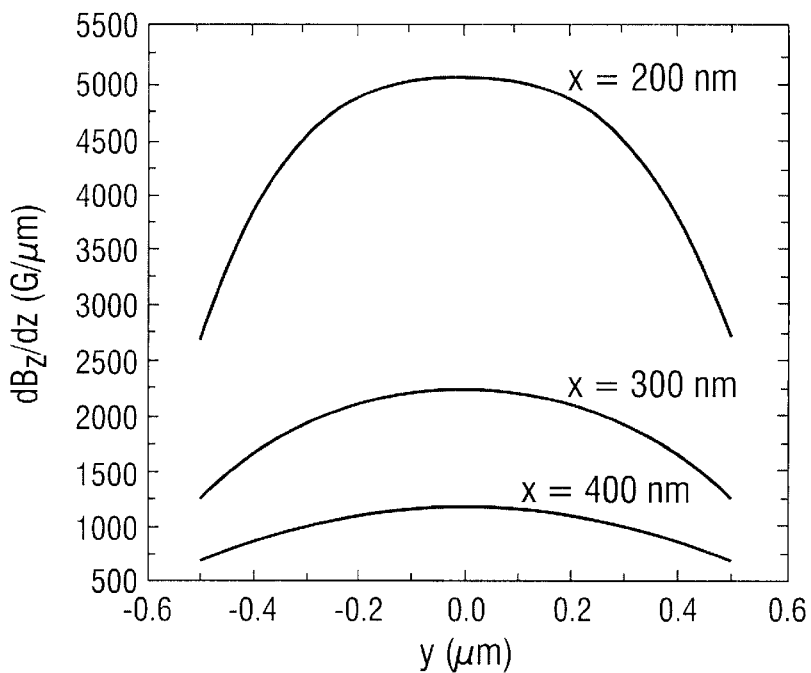
FIG. 7 is a plot of the decay of the perpendicular component of the estimated field gradient from a thin film magnet with separation from the magnet in the y-direction.

FIG. 7 is a plot of the decay in the z-component of the field gradient with separation in the y-direction. As can be seen, the dependence of the gradient on the separation in the y-direction is much less pronounced. This stems from the geometry of the thin film magnet which is assumed: it is wider than it is thick. With other magnet geometries, the dependence on the separation in the y-direction may be more pronounced.

Figure 8:
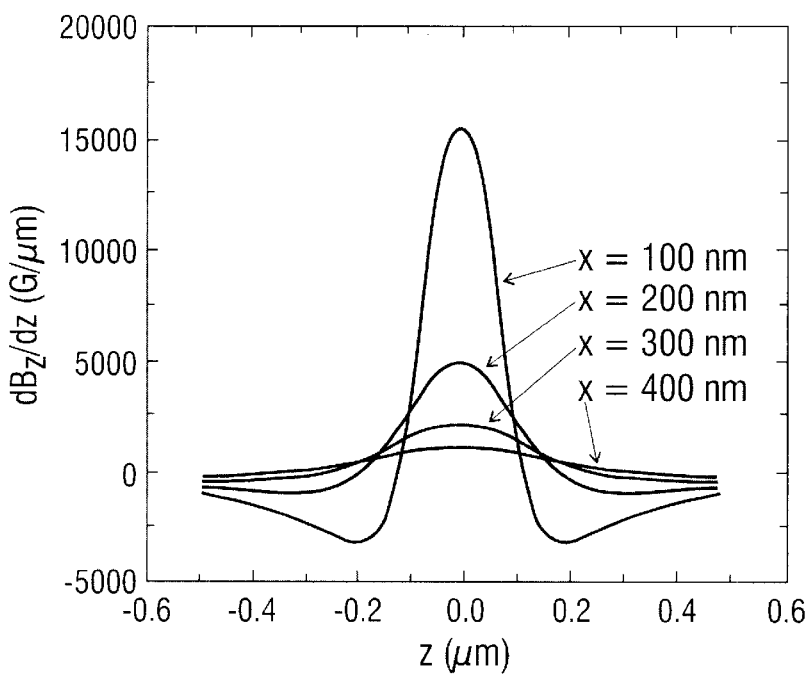
FIG. 8 is a plot of the decay of the perpendicular component of the estimated field gradient from a thin film magnet with separation from the magnet in the z-direction.

FIG. 8 is a plot of the decay in the x-component of the field gradient with separation in the z-direction. As can be seen, for a gap in the x-direction of 200 nm or more, the dependence on the gap in the z-direction is more pronounced than it is for gaps in the x-direction of less than 200 nm.

C. High Frequency Operation

Since the response time of the Hall junction is so fast, extremely high bandwidth displacement transducers are

| Case | $N_T$ (nV/Hz$^{1/2}$) | $N_V$ (nV/Hz$^{1/2}$) | $N_I$ (nV/Hz$^{1/2}$) | R V/$\mu$m/Hz$^{1/2}$ | $\partial z^{min}$ (Å/Hz$^{1/2}$) |
|---|---|---|---|---|---|
| 300K, n + GaAs | 13.1 | 0.0394 | 13.1 | 0.0891 | $1.47 \times 10^{-3}$ |
| 4.2K, n + GaAs | 1.55 | 0.0124 | 1.84 | 0.00891 | $2.07 \times 10^{-3}$ |
| 300K, 2DEG | 19.2 | 0.809 | 19.2 | 1.51 | $1.27 \times 10^{-4}$ |
| 4.2K, 2DEG | 0.11 | 1.16 | 1.54 | 3.09 | $4.98 \times 10^{-6}$ |

B. Attainable Field Gradients and Magnet/Junction Gap

Miniaturization of the magnet to the micro-or nano-level allows extremely large field gradients to be obtained at possible. This allows the displacement transducer of the invention to be scalable to high frequency applications.

EXAMPLE

A torsional diamond resonator approximately diamond in shape was built. The resonator was roughly 6 μm. on a side, and included a permalloy (Ni:Fe) thin film magnet 1 μm. wide by 8 μm. long by 150 nm thick. The resonator was composed of a GaAs heterostructure grown by molecular beam epitaxy (MBE) and having three layers. The topmost layer is a 75 nm. layer of n+GaAs, the middle layer is a 100 nm. layer of insulating GaAs, and the bottom layer is a 610 nm. AlAs layer. These were grown on an insulating GaAs substrate.

The resonator is supported by two torsion rods that terminate in supports attached to the substrate. A continuous line of Cr/Au is deposited on one side of the resonator so that acuation can be achieved by running current through the resonator in the presence of a strong transverse external magnetic field (see FIG. 4). This current generates a Lorentz force on the resonator.

Fabrication proceeds with the following steps: First, a photoresist template is deposited with AuNiGe contacts (layer 1). Then, finger pads are deposited for wirebonding (layer 2). Next, using ebeam lithography, the CrAu (about 400 Åtotal) line for the actuation current is deposited (layer 3). Then, an $SiO_2$ protective layer is sputtered on the finger pads using photolithography (layer 4). This is followed by ebeam definition and liftoff of $SiO_2$ masks for the Hall cross (layer 5), with an etch through the n+layer with an Ar ion mill (500 V beam voltage for about 27 sec.). At this point, the Hall cross is finished.

Then, the ferromagnet and Au cap are deposited (layer 6), followed by a $SiO_2$ mask (layer 7) for the resonator and blanket Hall cross-protection. At this point, only the suspension remains to be achieved.

The suspension etch is accomplished with a $Cl_2$-assisted Ar ion beam etch system at 1500 V beam voltage for 1:45 minutes. Suspension is then achieved with a brief (about 5 sec.) dip in $HF:HNO_3:H_2O$.

APPLICATIONS

Figure 9:
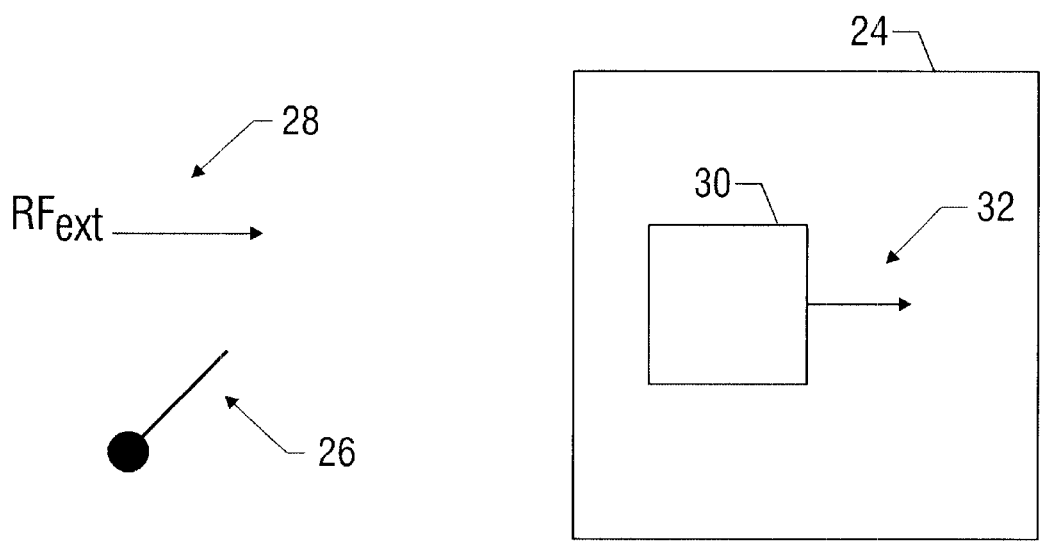
FIG. 9 illustrates an application in which a displacement transducer according to the to the invention is used in a magnetic resonance imager.

In one application, the displacement transducer of the subject invention is used for force detected magnetic resonance imaging. In this application, referring to FIG. 9, the transducer 30 is used in magnetic resonance imager 24 to sense the presence of or composition of biomolecules. Many biomolecules exhibit a magnetic moment 26, and when the magnet of the transducer 30 is placed close enough to the biomolecules, a magnetic resonance can be induced in the presence of an additional external R.F. electromagnetic field 28. Where this occurs, a time-varying force is exerted on the magnet. This force depends on the presence, structure and/or composition of the biomolecules. The voltage signal 32 produced by the transducer is representative of the displacement of the magnet responsive to the force. The voltage signal 32 can thus be used to detect the presence, structure and/or composition of the biomolecules.

Figure 10:
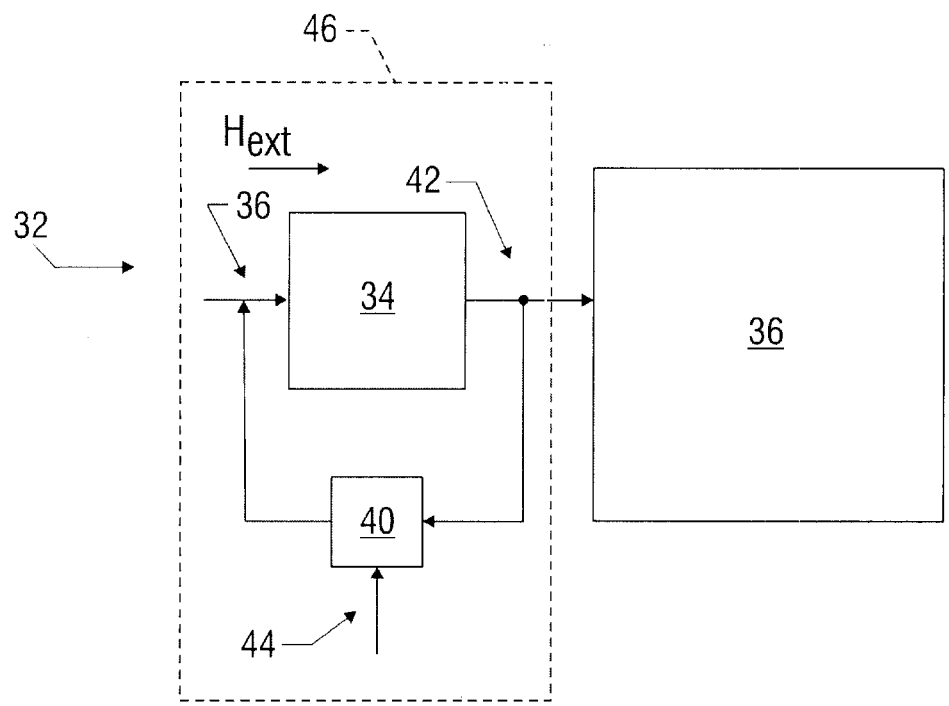
FIG. 10 illustrates an application in which a displacement transducer according to the invention is used in a mobile communications device.

In another application, referring to FIG. 10, the transducer 34 of the invention forms a low-power miniature oscillator 46 than can be used for a variety of purposes such as providing the clock to the electronics 36 of mobile battery-powered wireless communications devices 32. In this application, the. transducer 34 functions within a feedback loop 40 which provides actuation current 36 to the resonator (see FIG. 3). The actuation current 36 flows through the resonator in the presence of an external transverse magnetic field $H_{ext}$, and exerts a Lorentz force on the resonator. The displacement of the resonator is reflected in the voltage output 42 of the transducer. The output 42 of the transducer 34 drives a feedback loop 40 which adjusts the actuation current 36 of the resonator responsive thereto. The frequency of oscillation is compared to a desired oscillation frequency 44. Depending on this comparison, the frequency of the actuated current is adjusted until the frequency of oscillation is equal to the desired oscillation frequency.

Figure 11:
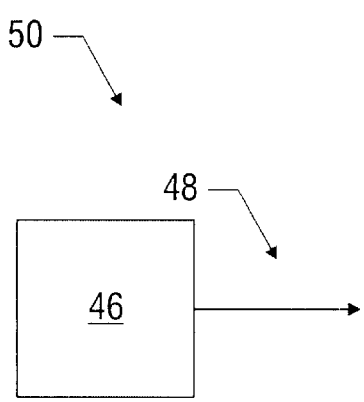
FIG. 11 illustrates an application in which a displacement transducer according to the invention is used in a computing device.

In yet another application, referring to FIG. 11, a low miniature oscillator 46 based on the transducer of the invention forms the clock 48 within computing device 50.

While embodiments, implementations, and examples of the invention have been shown and described, it should be apparent that there are many more embodiments, implementations, and examples that are within the scope of the subject invention. Accordingly, the invention is not to be restricted except in light of the appended claims and their equivalents.

What is claimed is:

1. A displacement transducer comprising:
   a substrate;
   an element suspended from the substrate and supported by it at one or more anchor points, wherein the element is displaceable responsive to a force;
   a Hall junction including a current path for supporting a flow of current;
   a miniaturized magnet, one or the other of the magnet and Hall junction supported by the element, and the other of the magnet and Hall junction stationary with respect to the substrate,
   wherein the magnet has an edge, and the Hall junction has a center spaced from the magnet edge by a sub-micron gap;
   wherein relative displacement between the element and the Hall junction by an amount x induces formation of a signal at the Hall junction representative of the amount x of the relative displacement between the element and the Hall junction; and
   one or more signal lines coupled to the Hall junction for providing the signal representative of the amount x of the relative displacement between the element and the Hall junction.

2. The transducer of claim 1 wherein the magnet is a thin film magnet.

3. The transducer of claim 1 wherein the magnet is a micro-scale magnet.

4. The transducer of claim 1 wherein the magnet is a nano-scale magnet.

5. The transducer of claim 1 wherein the element is a resonator.

6. The transducer of claim 5 wherein the resonator is generally diamond-shaped.

7. The transducer of claim 1 wherein the Hall junction is mounted on the substrate.

8. The transducer of claim 1 wherein the gap between the magnet edge and the Hall junction center is less than or equal to 500 nm.

9. The transducer of claim 8 wherein the gap is less than or equal to 400 nm.

10. The transducer of claim 9 wherein the gap is less than or equal to 200 nm.

11. The transducer of claim 1 wherein the substrate is a semiconductor substrate.

12. The transducer of claim 1 wherein the element includes a flow path for the flow of actuation current.

13. The transducer of claim 1 in combination with a source of a transverse magnetic field, wherein the flow of current through the element in the presence of the transverse magnetic field exerts a Lorentz force on the element.

14. The transducer of claim 1 in a force directed magnetic resonance imaging system.

15. An oscillator comprising the transducer of claim 1 actuated by a actuation current and a feedback loop which adjusts the actuation current responsive to the signal output of the transducer.

16. The oscillator of claim 15 in a wireless communications device.

17. The wireless communications device of claim 16 which is a mobile wireless communications device.

18. The mobile wireless communications device of claim 16 which is a handset.

19. The oscillator of claim 15 in a computing device.

20. The computing device of claim 19 which is a mobile computing device.

21. The transducer of claim 1 wherein the magnet is integrated with the element.

22. The transducer of claim 1 wherein the Hall junction is integrated with the element.

23. The transducer of claim 1 configured to provide a minimum resolvable displacement of about $2 \cdot 10^{-3}$ Å/Hz$^{1/2}$ or less.

24. The transducer of claim 1 configured to provide a sensitivity of about 0.09 V/$\mu$m/Hz$^{1/2}$ or more.

25. The transducer of claim 1 wherein the Hall junction is miniaturized.

26. The transducer of claim 1 wherein the Hall junction is a folded cross-shaped Hall junction.

27. A displacement transducer comprising:
    a substrate;
    an element suspended from the substrate and supported by it at one or more anchor points, wherein the element is displaceable responsive to a force;
    a Hall junction including a current path for supporting a flow of current;
    a miniaturized magnet, one or the other of the magnet and Hall junction supported by the element, and the other of the magnet and Hall junction stationary with respect to the substrate,
    wherein the magnet has an edge, and the Hall junction has a center spaced from the magnet edge by a gap which is small enough to allow direct magnetic flux linkage between the magnet and the Hall junction sufficient to achieve a desired minimum resolvable displacement;
    wherein relative displacement between the element and the Hall junction by an amount x induces formation of a signal at the Hall junction representative of the amount x of the relative displacement between the element and the Hall junction; and
    one or more signal lines coupled to the Hall junction for providing the signal representative of the amount x of the relative displacement between the element and the Hall junction.

28. A displacement transducer comprising:
    a substrate;
    an element suspended from the substrate and supported by it at one or more anchor points, wherein the element is displaceable responsive to a force;
    a Hall junction including a current path for supporting a flow of current;
    a miniaturized magnet, one or the other of the magnet and Hall junction supported by the element, and the other of the magnet and Hall junction stationary with respect to the substrate,
    wherein the magnet has an edge, and the Hall junction has a center spaced from the magnet edge by a gap which is small enough to allow direct magnetic flux linkage between the magnet and the Hall junction sufficient to achieve a desired transducer sensitivity;
    wherein relative displacement between the element and the Hall junction by an amount x induces formation of a signal at the Hall junction representative of the amount x of the relative displacement between the element and the Hall junction; and
    one or more signal lines coupled to the Hall junction for providing the signal representative of the amount x of the relative displacement between the element and the Hall junction.

29. A method of sensing relative displacement between a miniaturized magnetic flux source and a Hall junction comprising:
    relatively displacing a miniaturized magnetic flux source and a Hall junction by an amount x, wherein the magnet has an edge, the Hall junction has a center, and the magnet edge is spaced from the center of the Hall junction by a sub-micron gap; and
    inducing formation of a signal at the Hall junction representative of the amount x of the relative displacement between the flux source and the Hall junction.

30. The method of claim 29 wherein the relative displacing step comprises displacing the miniaturized magnetic flux source in relation to a stationary Hall junction.

31. The method of claim 29 wherein the relative displacing step comprises displacing the Hall junction in relation to a stationary miniaturized magnetic flux source.

32. The method of claim 29 further comprising exerting a force on one or the other of the miniaturized magnetic flux source and the Hall junction.

33. The method of claim 32 wherein the force is a Lorentz force.

34. The method of claim 32 further comprising exerting the force by causing an actuation current to flow in the presence of a transverse magnetic field.

35. The method of claim 32 wherein the force is a magnetic moment exhibited by a bio-molecule.

36. The method of claim 34 wherein the actuation current is an AC current having a frequency.

37. The method of claim 34 further comprising adjusting the actuation current responsive to feedback provided from the signal output by the transducer.

38. The method of claim 29 further comprising amplifying the signal formed at the Hall junction.

39. A method of sensing relative displacement between a miniaturized magnetic flux source and a Hall junction comprising:
    relatively displacing a miniaturized magnetic flux source and a Hall junction by an amount x, wherein the magnet has an edge, the Hall junction has a center, and the magnet edge is spaced from the center of the Hall junction by a gap which is small enough to allow direct magnetic flux linkage between the magnet and the Hall junction sufficient to achieve a desired minimum resolvable displacement; and
    inducing formation of a signal at the Hall junction representative of the amount x of the relative displacement between the flux source and the Hall junction.

40. A method of sensing relative displacement between a miniaturized magnetic flux source and a Hall junction comprising:
    relatively displacing a miniaturized magnetic flux source and a Hall junction by an amount x, wherein the magnet has an edge, the Hall junction has a center, and the magnet edge is spaced from the center of the Hall junction by a gap small enough to allow direct magnetic flux linkage between the magnet and the Hall junction sufficient to achieve a desired transducer sensitivity; and inducing formation of a signal at the Hall junction representative of the amount x of the relative displacement between the flux source and the Hall junction.

41. A displacement transducer comprising:

Hall junction means for supporting a flow of current;

miniaturized magnet means for providing a magnetic flux directly linked to the Hall junction means and spaced from the Hall junction means by a gap which is small enough to allow direct magnetic flux linkage between the magnet means and the Hall junction means sufficient to achieve a desired transducer sensitivity or minimum resolvable displacement; and means for relatively displacing the Hall junction means and the miniaturized magnetic means by an amount x, whereby a signal is induced at the Hall junction means which is representative of the amount x of the relative displacement.

42. A method of sensing relative displacement between miniaturized magnetic flux source means and Hall junction means comprising:

a step for relatively displacing the miniaturized magnetic flux source means and the Hall junction means by an amount x, wherein the miniaturized magnetic flux source means and the Hall junction means are spaced by a gap which is small enough to allow direct magnetic flux linkage between the magnet flux source means and the Hall junction means sufficient to achieve a desired transducer sensitivity or minimum resolvable displacement; and a step for inducing formation of a signal at the Hall junction means which is representative of the amount x of the relative displacement between the miniaturized magnetic flux source means and the Hall junction means.

43. A displacement transducer comprising:

a substrate;

an element suspended from the substrate and supported by it at one or more anchor points, wherein the element is displaceable responsive to a force;

a Hall junction including a current path for supporting a flow of current;

a miniaturized magnet, one or the other of the magnet and Hall junction supported by the element, and the other of the magnet and Hall junction stationary with respect to the substrate, wherein the Hall junction has a plurality of terminals in a folded, cross-shaped configuration;

wherein relative displacement between the element and the Hall junction by an amount x induces formation of a signal at the Hall junction representative of the amount x of the relative displacement between the element and the Hall junction; and one or more signal lines coupled to the Hall junction for providing the signal representative of the amount x of the relative displacement between the element and the Hall junction.

44. A method of sensing relative displacement between a miniaturized magnetic flux source and a Hall junction comprising:

relatively displacing a miniaturized magnetic flux source and a Hall junction by an amount x, wherein the Hall junction has a plurality of terminals in a folded, cross-shaped configuration; and inducing formation of a signal at the Hall junction representative of the amount x of the relative displacement between the flux source and the Hall junction.

* * * * *